United States Patent [19]

Goldstone

[11] 4,098,629

[45] * Jul. 4, 1978

[54] PROCESS FOR MAKING SOUND INSULATION COMPONENTS

[75] Inventor: Edward G. Goldstone, Huntington Woods, Mich.

[73] Assignee: Allen Industries, Inc., Troy, Mich.

[*] Notice: The portion of the term of this patent subsequent to Jul. 12, 1994, has been disclaimed.

[21] Appl. No.: 800,787

[22] Filed: May 26, 1977

Related U.S. Application Data

[63] Continuation-in-part of Ser. No. 673,737, Apr. 5, 1976, Pat. No. 4,035,215.

[51] Int. Cl.² .................................................. B32B 31/00
[52] U.S. Cl. ........................................ 156/87; 156/220; 156/245; 156/285; 264/134; 427/203; 427/381; 427/382
[58] Field of Search .................. 427/203, 381, 382; 156/71, 220, 242, 245, 285, 87; 264/122, 134

[56] References Cited

U.S. PATENT DOCUMENTS

| | | | |
|---|---|---|---|
| 3,772,071 | 3/1973 | Orsdel | 427/203 |
| 3,878,010 | 4/1975 | Zammit | 156/71 |
| 3,928,693 | 12/1975 | Rudloff | 264/122 |
| 3,975,483 | 8/1976 | Rudloff | 264/134 |
| 4,035,215 | 7/1977 | Goldstone | 156/245 |

*Primary Examiner*—Edward G. Whitby
*Attorney, Agent, or Firm*—Harness, Dickey & Pierce

[57] ABSTRACT

A process for making composite contoured sound insulating panels of a type suitable for use adjacent to structural panels of automobile vehicle bodies, which in accordance with one embodiment of the present invention, comprises forming a fibrous pad incorporating controlled amounts of heat curable thermosetting binder and a heat softenable thermoplastic binder distributed in a controlled manner therethrough. The pad is subjected to a preliminary curing step to bond the fibers together into an integral mass, whereafter a dense liquid vinyl plastisol coating is applied to at least one face surface of the pad, which thereafter is heated to effect a fusion of the coating into a heat softened integral layer, effecting a simultaneous heat softening of the thermoplastic binder, whereafter the heated pad is placed between appropriately contoured mold surfaces and is compressed to impart a preselected contour thereto and localized embossments therein and a desired surface finish to the plastisol layer, while simultaneously cooling the pad to effect a rigidification of the thermoplastic binder and the layer so as to retain the composite pad in the preselected contoured and embossed configuration. In accordance with an alternative embodiment of the disclosed process, the pad is subjected to a preliminary molding step, followed by the coating step, and is subjected to a final molding step after the plastisol coating has been fused at an elevated temperature. The step of molding the plastisol layer is performed employing a subatmospheric pressure to achieve improved definition in the contour and texture of the molded face surface.

32 Claims, 6 Drawing Figures

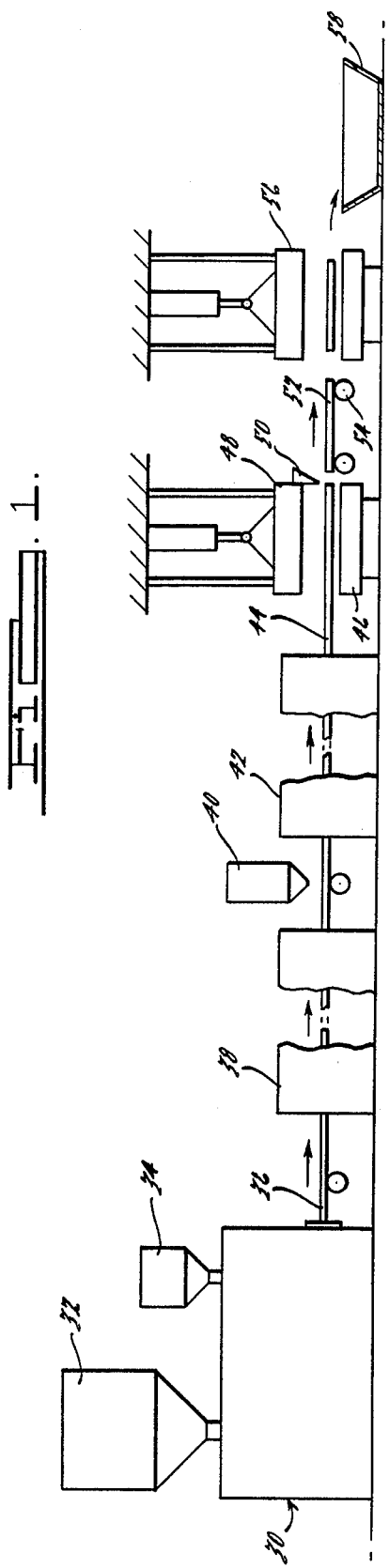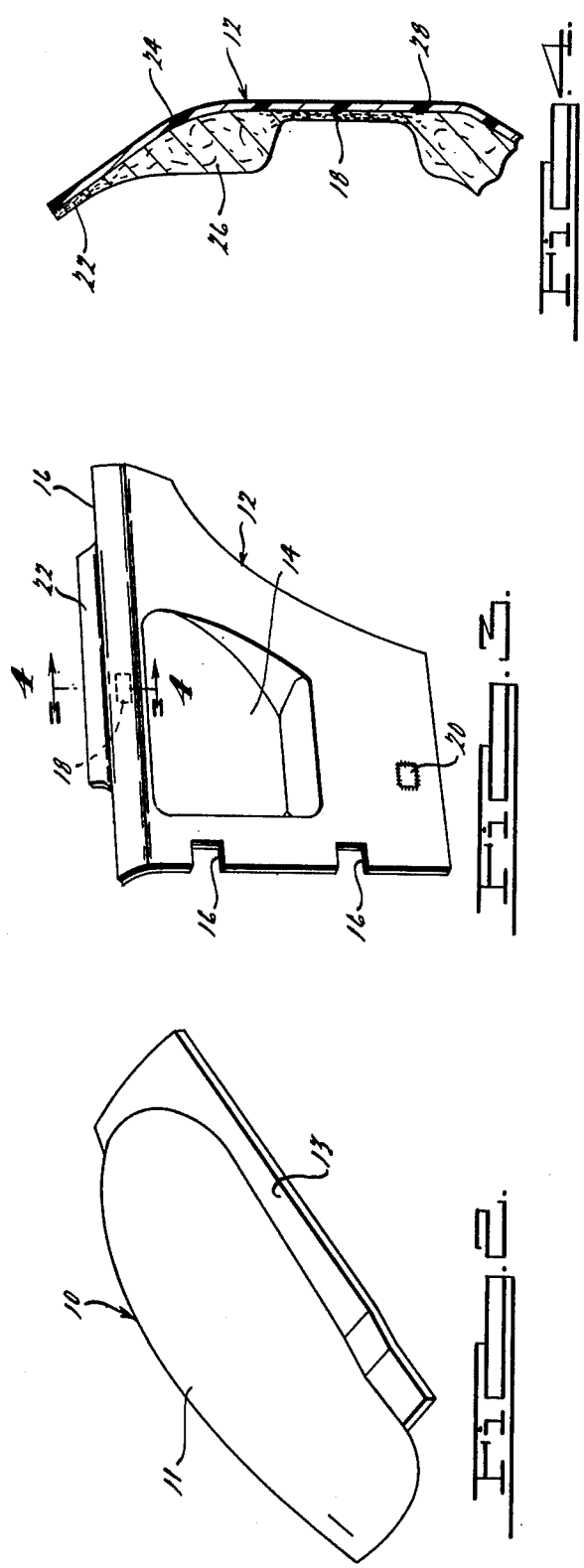

PROCESS FOR MAKING SOUND INSULATION COMPONENTS

CROSS-REFERENCE TO RELATED APPLICATIONS

The present application is a continuation-in-part of prior copending U.S. application Ser. No. 673,737, filed Apr. 5, 1976, now U.S. Pat. No. 4,035,215 for "Process for Making Sound Insulation Components".

BACKGROUND OF THE INVENTION

The process of the present invention is particularly applicable, but not necessarily restricted, to the production of sound insulating panels incorporating a preselected contoured and embossed configuration for use in the passenger compartments of automobile vehicles and the like. Composite sound insulating panels of the foregoing type are adapted to be disposed in overlying shape-conforming relationship against structural panels of vehicle bodies, providing for a significant reduction in the transmission of engine and road noise into the passenger compartment, over which a decorative trim panel or carpeting is applied. Typically, such sound insulating panels are applied over the floor pan, the toe board, the dash panel, the rear quarter panels, the trunk, under the hood and over the wheel housings of automobile bodies and must be accurately contoured and embossed to facilitate attachment to the supporting structural panel, such as by fasteners or adhesives, and to provide proper clearance for assembly of ancillary decorative panels and operating components.

Composite contoured sound insulating panels to which the present process is directed comprise a fibrous pad having a dense filled resinous coating applied substantially uniformly on at least one face surface thereof. Typical of the prior art processes heretofore employed in manufacturing such composite panels are those disclosed in U.S. Pat. Nos. 3,429,728 and 3,536,557. In accordance with the foregoing patented processes, fibrous panels are molded to impart a preselected shape-sustaining contour thereto, after which they are die-cut and subsequently are coated with a dense sound insulating substance, such as a highly filled asphaltic or bituminous base material. Considerable difficulty has been encountered in such prior art processes in achieving a uniform coating of the sound insulating material on the molded fibrous pad due to a puddling effect and a shading effect along substantially vertical and angular surfaces. The shading effect necessitates the use of excess coating material to assure attainment of minimum coating weights along such shaded areas.

The application of such hot melt or other high density coating materials has also occasioned some distortion of the molded fibrous pad, causing difficulties during installation and assembly operations of such composite sound insulating panels in vehicle bodies. The surface texture of the sound insulating coating applied in accordance with prior art practices also is somewhat irregular and has occasioned, at times, difficulty of achieving appropriate alignment and registration of the composite contoured panel and the structural components of vehicle bodies.

The present invention overcomes many of the problems and disadvantages associated with prior art practices by providing a process which provides for a more uniform coating of the dense sound insulating layer, achieving thereby improved performance and a conservation of raw material, which enables the application of a desired surface texture or finish to the dense insulating coating, and which provides for a more accurate contouring and embossment of the panel and improved definition of surface contours and embossed areas therein.

SUMMARY OF THE INVENTION

The benefits and advantages of the present invention are achieved in accordance with one of the embodiments of the disclosed process in which a fibrous pad is formed which is of substantially uniform thickness and density, and which is impregnated with a controlled amount of a heat curable thermosetting binder and a heat softenable thermoplastic binder, preferably in the form of a powder distributed in a controlled manner throughout the fibrous matrix. The fibrous pad is heated to an elevated temperature for a period of time sufficient to effect at least a partial curing of the thermosetting binder and a heat softening of the thermoplastic binder so as to fuse and coat the fibers at their points of contact, forming an integral porous fibrous pad which can be handled without tearing or delamination during the succeeding process steps. A liquid vinyl plastisol coating containing a particulated filler in an amount up to about 80% by weight is applied to at least one face surface of the pad or about ambient temperature, and the resultant coated pad is thereafter heated at an elevated temperature usually ranging from about 350° F to about 450° F to effect a fusion of the plastisol into an integral heat softened flexible layer, while simultaneously effecting a heat softening of the thermoplastic binder and a final curing of the thermosetting binder. The resultant heated pad, with the thermoplastic binder and the plastisol layer still in a heat softened condition, is thereafter positioned between a pair of opposed contoured mold surfaces and is compressed therebetween to impart a preselected contour to the pad and a localized embossment of certain areas thereof, as well as the application of a desired surface finish to the fused plastisol layer. The contoured mold surface against which the heat softened and fused plastisol layer is disposed is of a foraminous structure, enabling the application of subatmospheric pressure or vacuum to cause the heat softened layer to be drawn in intimate shape-conforming contact therewith. While in the mold, the pad is simultaneously cooled to a temperature at which a rigidification of the thermoplastic binder and plastisol layer occurs, whereby the composite pad is retained in the preselected contoured and embossed configuration.

In accordance with an alternative embodiment of the present invention, the fibrous pad after impregnation with a controlled amount of thermosetting and thermoplastic binder is subjected to a partial curing of the thermosetting binder to impart integrity to the pad, whereafter the pad is molded at an elevated temperature while in a compressed and contoured condition between a pair of mold surfaces to impart a preliminary preselected contour and embossed configuration thereto, which is retained in response to a further curing of the thermosetting binder. The preliminarily contoured pad thereafter is coated with the loaded vinyl plastisol, which subsequently is fused into an integral layer, and the preliminarily contoured and coated pad thereafter is subjected to a final molding step including the application of vacuum to the heat softened fused plastisol layer during the molding operation in which the pad is simultaneously cooled to effect a rigidification and shape retention of the thermoplastic resin binder and the plastisol layer.

In accordance with still another embodiment of the present invention, only a heat curable thermosetting binder is employed which is partially cured prior to the preliminary molding step and is substantially completely cured during the following fusion step of the vinyl plastisol coating. The final molding operation is performed such that the plastisol layer is cooled and rigidified to retain the final contoured and embossed configuration of the composite pad. The final molding operation is performed with the assistance of a vacuum applied to the mold surface, against which the heat softened fused plastisol layer is disposed to effect accurate contouring and texturing of the exterior surface thereof, or alternatively, the heat softened and fused plastisol layer is retained in shape-conforming heat-conducting contact with the contoured mold surface by a flexible impervious diaphragm applied over the opposite surface of the composite pad to which pressure is applied for pressing the pad against the contoured mold surface.

Further benefits and advantages of the present invention will become apparent upon a reading of the description of the preferred embodiments taken in conjunction with the accompanying drawings.

BRIEF DESCRIPTION OF THE DRAWINGS

FIG. 1 is a schematic side elevational view of the sequence of steps employed in manufacturing composite contoured sound insulating components in accordance with one embodiment of the present invention;

FIG. 2 is a perspective view of a molded composite sound insulating component adapted to be disposed over a structural wheelhouse panel of an automobile body;

FIG. 3 is a perspective view of a composite contoured sound insulating component adapted to be disposed adjacent to a rear quarter panel of an automobile vehicle body;

FIG. 4 is a fragmentary magnified transverse sectional view of the insulating panel shown in FIG. 3 and taken substantially along the line 4—4 thereof;

DESCRIPTION OF THE PREFERRED EMBODIMENTS

Figure 5:
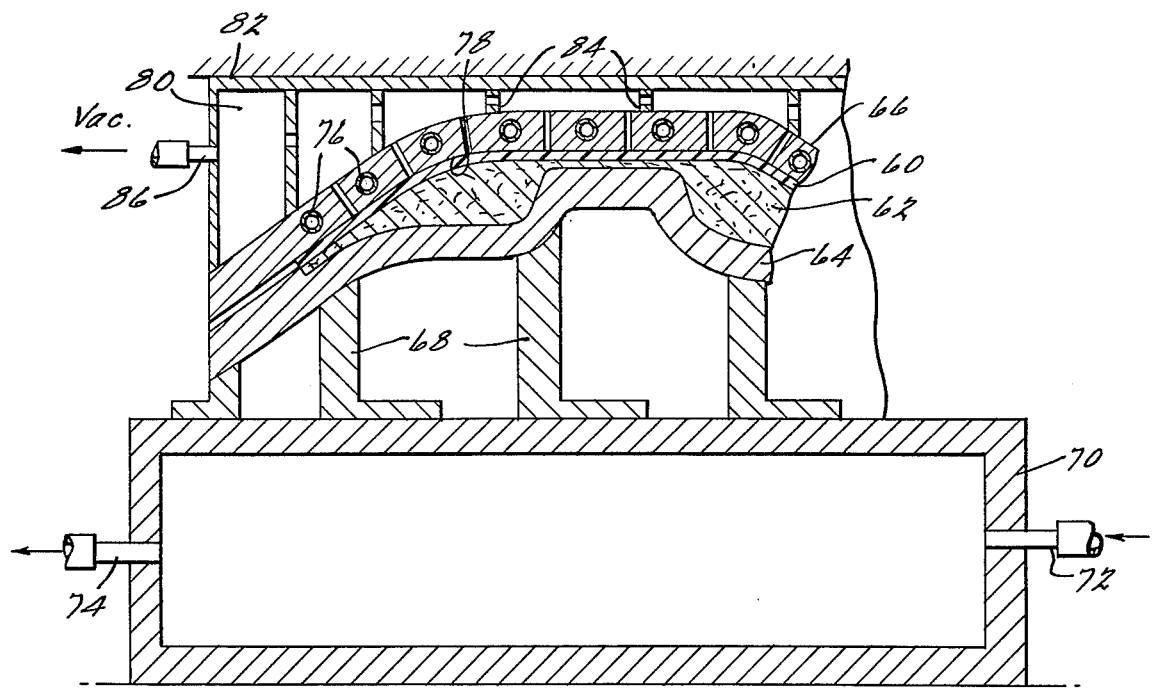
FIG. 5 is a fragmentary transverse sectional view of a press arrangement for molding insulating components employing an upper mold half provided with perforations for applying a vacuum to the fused plastisol layer.

Referring now in detail to the drawing, composite contoured sound insulating panels or pads typical of those which can be satisfactorily produced in accordance with the practice of the present invention are illustrated in FIGS. 2 and 3. A composite sound insulating panel 10 is shown in FIG. 2, including a curved section 11, which is adapted to be disposed in contour conforming relationship over the wheelhouse panel of an automobile body, and a contoured flat section 13, which overlies the floor panel to reduce transmission of road noises into the interior of the passenger compartment. FIG. 3 shows a composite sound insulating panel 12 which is illustrative of alternative embossed and contoured configurations which can be satisfactorily produced in accordance with the practice of the present invention. The composite panel 12, as illustrated in FIG. 3, is of a type adapted to be disposed adjacent to the rear side quarter panel of automobile vehicle bodies and in shape-conforming relationship relative to an interior decorative trim panel defining the interior of the passenger compartment. As shown, the composite sound insulating panel 12 is formed with a contoured depression 14 to accommodate an arm rest depression in a trim panel and is further formed with notched cut-out sections 12, which are conveniently die-cut in the formed panel. In addition, the composite panel 12 includes embossed sections, indicated at 18, 20, as well as a longitudinally extending section 22 along the upper edge thereof, which is of reduced thickness to provide the required clearance for assembly and installation of the composite pad in automobile vehicle bodies.

The longitudinally extending section 22 and embossed section 18 are more clearly shown in the magnified sectional view comprising FIG. 4 of the drawing. As shown, the composite embossed pad 12 comprises a dense insulating coating or layer 24 of substantially uniform thickness applied to at least one face of a fibrous pad 26, which may be of uniform thickness and density and may also contain localized selected embossments, such as the embossed sections 18 and 22, for any one of a variety of reasons. As will be noted, the fibrous pad 26 in the localized embossed sections is of an increased density as a result of the compaction of the fibrous structure to achieve the desired reduced thickness, whereby the fibrous structure may assume densities approaching 110% of theoretical density. The insulating layer 24 is of substantially uniform thickness over the entire area of the panel, including the embossed sections, and may also be provided with controlled variations in thickness as may be desired. The exterior surface of the insulating layer 24, as indicated in FIGS. 3 and 4, can be provided with any desired surface finish or texture to achieve optimum performance of the composite panel and to further facilitate its installation and fastening to adjacent structural and trim panels.

The fibrous pad portion of the composite sound insulating panel is comprised of a mass of randomly arranged fibers of any one or mixtures of the types well known in the art, including those of animal, vegetable and synthetic origin. In accordance with the practice of the present invention, fibers are selected which are of a length and strength and possessed of inherent flexibility to enable the formation of a fibrous network which is porous and possesses some resiliency. The mechanical properties of the fibers preferably are such to enable them to be passed through a garnetting or carding machine to effect a combing and random orientation thereof into an elongated fibrous blanket or batt without encountering any substantial degree of breakage or disintegration of the fiber filaments. Fibers which possess mechanical properties of the foregoing type include naturally-occurring vegetable origin fibers such as cotton, hemp, jute, ramie, sisal, cellulose, abaca and the like. Typical naturally-occurring animal origin fibers include wool, silk, hair from cattle, horses and hogs, chicken feathers, etc.; while fibers of a synthetic origin include cellulose acetate, viscose rayon, nylon, vinyl chloride, protein base fibers such as casein and soybean; glass fibers and the like. In addition to the foregoing mechanical properties, the fibers also should have a resistance to thermal degradation at the elevated temperatures to which the pad is exposed during the curing and plastisol fusion steps.

The formation of a substantially uniform fibrous blanket or batt of the desired thickness is achieved in accordance with any of the well known techniques such as, for example, by passing fibers through a suitable garnetting or carding machine forming a web which passes through a suitable lapper in which an overlapping of the web is performed until a batt of the desired thickness is obtained. Alternatively, the blanket or batt can be formed by any of the well known air laying techniques in which the binding agent is introduced during the formation of the batt. The particular thickness and density of the fibrous batt can be carried over a broad range consistent with the intended end use of the composite insulating panel. Conventionally, fibrous blankets of a thickness of from about one inch to about three inches and of a density of from about one to about six ounces per square foot are prepared in the lapper which subsequently are compressed and at least partially cured to form an integrated matrix enabling further handling of the fibrous mass without delamination and/or tearing.

During the formation of the fibrous blanket, a suitable binding agent in a finely particulated or powder form is introduced to effect a substantially uniform impregnation of the fibrous matrix. Binder concentrations ranging from as low as about 10% up to about 45% by weight based on the total weight of the fibrous blanket can be satisfactorily employed, with the higher concentrations providing for greater rigidity of the resultant molded and contoured pad. Particularly satisfactory results are obtained when the binder constituent is controlled within a range of about 25% up to about 35% by weight of the fibrous blanket.

The particular resinous binder employed can be varied somewhat, with the preferred binder comprising a controlled mixture of a thermoplastic resin in combination with a thermosetting resin. In accordance with one practice of the process of the present invention, the thermoplastic resin is employed in an amount ranging from about 15% to about 95%, preferably about 50% up to about 75%, of the total binder content, with the balance comprising thermosetting resin in an amount sufficient to integrally bond the fibrous matrix together and to retain its integrity in spite of being heated to elevated temperatures preliminary to the molding operation. It is also contemplated in accordance with alternative practices of the present invention that the thermosetting binder constituent can be employed in an amount up to 100%, with concentrations of from about 50% to about 75% thermosetting binder being preferred.

The thermosetting binder may comprise any one of a variety of thermosetting type resins including phenol aldehyde resins, urea resins, melamine resins or the like, of which the condensation product of phenol with formaldehyde constitutes a preferred material. In addition to the foregoing synthetic resins, various lattices, either of natural or synthetic rubber, as well as synthetic resin lattices such as urethane or the like, can also be satisfactorily employed. In the latter event, the lattices are spray-applied to the fibrous web as it emerges from the garnetting machine and passing into the lapper.

The thermoplastic resin, on the other hand, may comprise any one of a variety of thermoplastic heat softenable resins which are compatible with the fibrous structure and have a heat softening range of from about 220° F to about 400° F, and preferably from about 250° F.

Thermoplastic resins suitable for this purpose include polyethylene, polystyrene, polypropylene, acrylic, polyvinyl acetate, polyvinyl chloride resins, polyvinyl copolymers, and the like, of which polyvinyl chloride constitutes a preferred material. A particularly satisfactory polyvinyl resin in powder form is commercially available from Union Carbide Corporation under the designation VYHH, which comprises a copolymer of vinyl acetate and vinyl chloride.

The thermoplastic resin powder, by itself or in admixture with the thermosetting resin binder, can be impregnated into the fibrous batt upon emergence from the garnetting machine during its passage into the lapper, for example, or during the alternative air laying operation, whereby a uniform dusting of the web structure is effected to provide a substantially uniform impregnation.

After impregnation with binder, the fibrous blanket or batt emerges and is passed through a curing oven in which the batt is compressed to a preselected thickness between a pair of moving pervious conveyors and is heated to an elevated temperature to effect at least a partial curing of the thermosetting binder present, as well as a heat softening of any thermoplastic resin binder present to effect a coating of the fibers at their points of contact, such that upon cooling thereof, a rigidification and bonding of the fibrous matrix into an integral pad is effected.

The dense insulating layer 24 of the pad shown in FIG. 4 comprises a fused highly-filled polyvinyl chloride plastisol containing from as little as about 30% to as high as about 80% by weight of a finely particulated filler. Polyvinyl chloride plastisols containing from about 70% to about 75% by weight filler are particularly satisfactory in accordance with the practice of the present process. The use of finely particulated fillers or extenders which are of relatively low cost provides economics in applying a coating of a desired weight per unit area and also serves to increase the density of the layer, increasing its ability to absorb sound. Suitable extender or low cost particulate filler materials include, for example, powdered slag, slate flour, fly ash, limestone, barium sulfate, or the like, of which barium sulfate constitutes a preferred filler.

The plastisol itself comprises a dispersion of a finely-divided polyvinyl resin in a plasticizer which may typically comprise about 100 parts resin and about 50 parts up to about 100 parts plasticizer, forming a liquid which can be applied in the form of a coating on one face of the fibrous pad, such as by roll, knife or spray coating or by a curtainous stream coater beneath which the pad passes. In addition to the extender filler, the liquid plastisol composition may further contain a pigment, suitable stabilizers, viscosity depressant, and a controlled amount of organic solvent to adjust the viscosity of the solution to within a desired range. The molecular weight of the polyvinyl chloride resin particles in the plastisol composition are such so as to provide a fusion of the resin particles and plasticizers, forming an integral layer at temperatures which range from about 350° F up to about 450° F, with fusion temperatures of from about 375° F to about 425° F being particularly satisfactory. The fusion of the plastisol at temperatures in excess of about 450° F is generally undesirable due to the tendency of the plasticizer to volatilize, whereby the resultant sound insulation layer tends to lose its resiliency. The particular time and temperature relationship employed in any specific instance to effect a fusion of the plastisol coating into an integral layer will vary in consideration of the particular polyvinyl plastic particles employed, the type or types of plasticizers used, the thickness of the coating deposited on the pad and the quantity and type of other constituents incorporated in the plastisol formulation. It will be understood that during the fusion operation, the temperatures of the air surrounding the plastisol layer may exceed the permissible temperature range of about 350° F to about 450° F previously set forth, but the residence time of the coated pad in the fusion oven is controlled to avoid the coating itself from exceeding a maximum temperature of about 450° F.

The liquid plastisol coating composition is applied to at least one face of the fibrous pad while at a temperature ranging from ambient temperature up to as high as about 115° F. The coating is applied in amounts usually ranging from about five ounces up to about 30 ounces per square foot of pad surface, and usually is applied substantially uniformly thereover. A partial penetration of the plastisol coating into the surface of the fibrous pad, followed by subsequent fusion of the coating, effects a bonding of the fibrous substrate and the integral polyvinyl layer at the interface therebetween, forming an integral composite pad which possesses some resiliency and is of a preselected shape-retaining embossed and contoured configuration.

In accordance with a preferred embodiment of the present invention, the contoured composite sound insulating panel is produced in accordance with the sequence of operations as schematically illustrated in FIG. 1 of the drawing. As shown, a fibrous feed material is introduced into a carding or garnetting machine, indicated at 30, from an overhead hopper 32 in a manner to form a randomly oriented web which enters a lapper at the right-hand end of the garnetting machine 30, at which a suitable mixture of a thermoplastic and thermosetting binder in a hopper 34 containing from about 15% up to 95% thermoplastic constituent is uniformly impregnated in the fibrous blanket formed. The resultant impregnated fibrous blanket, indicated at 36, emerges from the formation apparatus, and enters a curing oven 38 in which it is heated to an elevated temperature sufficient to effect at least a partial curing of the thermosetting binder constituent and a heat softening of the thermoplastic binder constituent to effect a bonding of the fibers together at their points of contact, forming an integral fibrous matrix.

Upon emergence from the curing oven 38, the cured blanket 36 passes beneath a coating device, indicated at 40, in which a filled liquid vinyl plastisol coating is discharged in the form of a substantially uniform curtain-like stream of a controlled thickness, providing a coating on the upper face of the fibrous blanket of the desired weight per unit area. The coated blanket thereafter enters a fusion oven 42 in which the coated blanket is heated to raise the temperature of the plastisol coating to within a range of about 350° F to about 450° F, effecting a fusion thereof and a bonding to the fibrous substrate. During the fusion step, a further curing of the thermosetting binder in the fibrous pad is effected while a heat softening of the thermosetting binder also occurs. The fused vinyl layer on the upper surface of the pad upon emergence from the fusion oven 42 also is in a heat softened condition.

The composite continuous blanket incorporating the heat softened dense insulating layer on the upper surface thereof, indicated at 44, upon emergence from the fusion oven passes into a molding station comprising a lower stationary mold, as schematically indicated at 46, and a vertically movable upper mold section 48, which are formed with appropriate mated contoured surfaces to effect a controlled compression and deformation of the composite blanket 44 to impart selected embossments and curvatures therein in a manner as previously described in connection with FIGS. 2–4. The mold halves 46, 48 are cooled so as to effect a cooling of the composite blanket from its entry temperature of about 350° F to about 450° F to a lower temperature while maintained in the compressed and deformed condition so as to effect a rigidification of the heat softened fused polyvinyl plastisol layer and the thermoplastic binding agent. The temperature of the mold surfaces preferably are maintained at about 40° F or lower, and this is achieved by transferring a suitable cooling fluid, such as a water ethylene glycol mixture, therethrough in a manner to extract the heat transferred to the mold by the preheated composite blanket.

The dwell period of the molded composite blanket in the cooling molds is controlled from about 10 to about 60 seconds, preferably about 20 to 30 seconds, which will vary depending upon the specific type of thermoplastic binder and plastisol layer employed. In any event, the dwell period is controlled to effect a sufficient cooling of the composite pad, such that the thermoplastic binder in the fibrous pad portion thereof sufficiently rigidifies to maintain the localized embossed fibrous portions in the preselected embossed configuration and to further retain the non-embossed fibrous portions thereof in the preselected contoured configuration. Additionally, at least a partial rigidification of the plastisol layer is effected, which also assists in maintaining the molded pad in the preselected contoured and embossed configuration.

The surface of the upper mold against which the hot plastisol layer is disposed may conveniently be provided with a surface texture or pattern to impart a corresponding texture or pattern to the outer surface of the fused plastisol layer during the cold molding operation. It is also preferred, in accordance with the arrangement illustrated in FIG. 1, that the upper mold section 48 include a cut-off knife, indicated at 50, to effect a simultaneous severing of the molded composite blanket during the closure of the molds.

In accordance with a preferred embodiment of the present invention, the molding of the composite heat softened blanket is performed employing a foraminous or perforated upper mold in accordance with the arrangement illustrated in FIG. 5, whereby a subatmospheric pressure or vacuum can be applied to the heat softened plastisol layer during the molding operation, achieving intimate conforming contact of the layer with the mold surface. This provides for improved contact with a corresponding improvement in the definition of the texturing and contouring applied to the molded plastisol layer, as well as increased heat transfer from the plastisol layer to the cooled mold. As shown in FIG. 5, a composite sound insulating component of a configuration similar to that illustrated in FIG. 4 and comprising a fused plastisol insulating layer 60 integrally bonded to a fibrous pad 62 is disposed between a lower stationary mold section 64 and an upper vertically movable mold section 66. The lower mold section 64 may be comprised of a suitable metallic or other good heat conducting material and is adjustably secured by means of a series of L-shaped ribs 68 on the upper surface of a liquid cooled lower platen 70 having its base in turn supported on the press bed. The lower platen 70 is suitably provided with an inlet port 72 and an outlet port 74 for circulating a cooling fluid, such as water or water-ethylene glycol mixture, for extracting heat from the lower mold section by conduction through the L-shaped ribs 68.

The upper mold section 66 similarly is comprised of a suitable heat conducting material and in the specific embodiment illustrated, incorporates a plurality of stainless steel tubes 76 embedded therein, through which a suitable cooling fluid is circulated, such as water or a water-ethylene glycol mixture, to effect an extraction of heat therefrom in a manner and for the purposes previously described. In addition, the lower mold section is provided with a plurality of perforations or holes extending therethrough which are disposed at carefully positioned locations and intervals and extend from the outer surface 78 of the upper mold section and are positioned with the inner portions thereof in communication with a vacuum chamber 80 defined by an outer casing 82 extending over and around the upper surface of the upper mold section. A plurality of perforate ribs or webs 84 are affixed to the upper surface of the upper mold section to provide for further rigidification of the casing 82. The interior of the vacuum chamber 80 is connected to a suitable source of reduced atmospheric pressure, such as a vacuum pump, through a port 86 provided in the lefthand side thereof, as viewed in FIG. 5.

It will be apparent from the foregoing arrangement that upon closure of the press in which the upper mold section is disposed in a position as illustrated in FIG. 5 and the sound insulating component is compressed to the configuration as illustrated, the vacuum is applied whereby the heat softened insulating layer 60 is drawn upwardly into accurate shape-conforming contoured relationship with respect to the surface 78 of the upper mold section, assuring intimate transfer contact therebetween and further assuring any desired surface texturing of the insulating layer, such as a grained leather appearance, woven fabric texture, smooth polished surface or combinations thereof. The imposition of a vacuum to the exterior of the heat softened insulating layer does not materially affect the contouring of the fibrous pad portion 62 in view of its porosity and the substantially impervious nature of the insulating layer. In those instances in which the insulating layer incorporates desired discontinuities therein, the disposition of the vacuum holes is such as to draw and retain the insulating layer in shape-conforming relationship relative to the mold surface. The magnitude of the vacuum applied will vary depending upon the intricacy and depth of the contouring of the mold surface, as well as the type and definition desired of any texturing to be imparted to the exterior face of the insulating layer. While vacuums of a magnitude up to an absolute vacuum (29.92 inches mercury) can be employed, for commerical purposes, vacuum ranging from about 20 to about 28 in. Hg are ordinarily satisfactory for this purpose. Appropriate contouring of the fibrous portion of the pad is achieved in response to the rigidification of the thermoplastic binder to retain the fibrous pad in substantial conformance with the configuration of the contour of the lower mold section.

Following the molding operation, such as indicated in FIG. 5, the severed and molded section, indicated at 52 in FIG. 1, is transferred by a conveyor 54 to a press 56 in which the blanked section is die-cut to provide an accurate peripheral shape, as well as to impart selected notches and apertures in the composite sound insulation panel. The resultant die-cut panel is transferred from the press 56 to a hopper 58 for storage and ultimate shipment.

It will be apparent from the process as hereinabove described in accordance with the sequence as schematically illustrated in FIG. 1, that the embossed and contoured shape-retaining configuration of the resultant composite panel is provided by the simultaneous rigidification of the thermoplastic binder and the fused plastisol layer, while the thermosetting binder imparts integrity to the fibrous pad during the processing thereof. The molding of the composite blanket while in a heated condition directly from the fusion oven provides for conservation of energy and provides improved moldability of the composite blanket, achieving more accurate embossed and contoured configurations therein. The application of the plastisol coating to the fibrous batt while in a flat condition also assures a more uniform application thereto without any tendency to puddle or shade angled surfaces, and the subsequent cold molding of the fused layer enables selected texturing or surface finishes to be imparted to the exterior plastisol layer.

The process sequence as previously described in connection with the arrangement shown in FIG. 1 can be modified such that the cured blanket 36 upon emergence from the curing oven 38 is die-cut into pads of the appropriate size, which thereafter are individually coated, such as by passage beneath the coating device 40, after which they are transferred to the fusion oven 42. The individual pads having the fused coating thereon, upon emergence from the fusion oven, are molded as before to final shape. This sequence of steps eliminates the final cutting and trimming steps required in the process as depicted in FIG. 1.

It is also contemplated in accordance with an alternative embodiment of the present invention that the fibrous blanket, upon impregnation with binder and a partial curing of a thermosetting binder constituent therein to impart integrity to the fibrous structure, is molded prior to coating into a preliminary shape-retaining configuration. In accordance with this alternative embodiment, the fibrous binder constituent preferably comprises from about 50% up to about 75% of a thermosetting binder in admixture with from about 50% to about 25% of a thermoplastic binder of the same types previously described. It is also contemplated, however, that the binder may be completely comprised of a thermosetting binder. A partial curing of the thermosetting binder constituent in the fibrous blanket prior to molding is performed to impart integrity to the pad to avoid tearing or delamination thereof. The partial curing can be achieved by applying heat to the opposed outer surfaces of the impregnated blanket, effecting some penetration into the interior of the pad, as well as by passing hot air through the pad to effect a partial curing throughout the thickness of the pad. In any event, the curing step is carried out so as to only effect a partial curing of the thermosetting binder, enabling a subsequent preliminary molding of the blanket or sections cut from the blanket into preliminarily contoured pads at an elevated temperature sufficient to effect a further and substantially complete curing of the thermosetting binder. The preliminary molding step is carried out employing heated mold sections between which the blanket is compressed and deformed, and the heating and curing of the thermosetting binder can be accelerated by passing hot air through the porous molded blanket to effect a bonding of the fibers in the deformed configuration, imparting a preliminary contoured and embossed configuration thereto.

The preliminarily molded pad thereafter is passed beneath a coating device, such as the device 40 shown in FIG. 1, while supported on a foraminous conveyor, whereby a controlled coating of a filled plastisol material is applied to at least one face surface thereof. The balance of the plastisol which is not deposited on the fibrous pad is recovered and recirculated. The coated contoured pad thereafter passes into the fusion oven in which a fusion of the plastisol coating into an integral layer is effected and a heat softening of any thermoplastic binding agent, if present, is also simultaneously effected. The resultant preliminarily molded pad incorporating a heat softened thermoplastic binder, if present, and an integral heat softened plastisol layer bonded thereto, is thereafter transferred to a cold molding operating, such as the lower and upper molds 46, 48 as shown in FIG. 1, or the mold arrangement as illustrated in FIG. 5 in which it is remolded to a final shape and is simultaneously cooled to effect a rigidification of the plastisol layer, as well as any thermoplastic binder present in the fibrous pad portion thereof. When using a combination of both thermosetting and thermoplastic binder in accordance with this alternative embodiment, somewhat improved definition of localized embossed sections and a contouring of the fibrous pad portion is obtained in comparison to when employing only thermosetting binder alone, in which primary reliance of further contouring during the finish molding step is placed on the rigidification of the heat softened plastisol layer.

Figure 6:
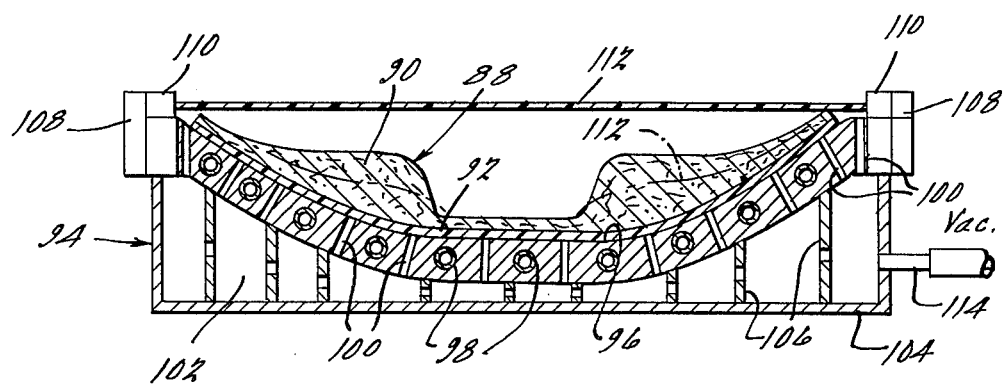
FIG. 6 is a transverse vertical sectional view illustrating still another alternative method for final molding the sound insulating component utilizing a foraminous lower mold and overlying flexible diaphragm.

When the binder employed is comprised substantially entirely of a thermosetting-type binder, the preliminarily molded pad incorporating the heat softened and fused insulating layer thereon can be finally molded in a vacuum forming die, such as illustrated in FIG. 6 of the drawings, in lieu of the contoured mold arrangements as illustrated in FIGS. 1 and 5. As shown in FIG. 6, a contoured sound insulating component, indicated at 88, comprising a preliminarily molded fibrous pad 90 incorporating a fused heat softened plastisol insulating layer 92 on one face surface thereof, is placed in a vacuum die 94 with the face of the insulating layer 92 disposed in contact with the appropriately contoured and textured upper surface 96 of the die. The die 94 may be constructed similar to the upper mold section 66 of FIG. 5 and is comprised of a suitable heat conductive material having a plurality of cooling tubes 98 embedded therein and formed with a plurality of perforations or vacuum holes 100 extending inwardly from the die surface 96 to a vacuum chamber 102 defined by a die casing 104 surrounding the sides and the base of the die. The die surface is suitably supported by a series of perforate ribs or webs 106 at positions intermediate the sides thereof.

The outer edge of the vacuum die is formed with a suitable frame 108 on which an inner frame 110 is removably mounted for movement between a closed position as shown in FIG. 6 to a open position providing access to the die cavity for loading and unloading sound insulating components therefrom. A flexible diaphragm 112 of a suitable impervious flexible material such as rubber, for example, is attached to the frame and extends over the die cavity. In the specific arrangement shown in FIG. 6, the diaphragm is disposed in a substantially horizontal position with the insulating component 88 disposed in appropriate registration over the contoured die surface 96. In response to the application of vacuum to the vacuum chamber 102, such as through a vacuum supply pipe 114 connected to the die casing, the substantially impervious insulating layer 92 is drawn into intimate contact with the die surface and the region above the upper surface of the fibrous pad and the diaphragm 112 also becomes partially evacuated as a result of passage of air through the porous fibrous pad and out through terminal vacuum points adjacent to the edge of the die. As a result, the diaphragm 112 moves downwardly from the position as shown in solid lines in FIG. 6 to a position as shown in phantom in which a further compaction of the fibrous pad is effected, and a further pressure is applied to the insulating layer to cause it to be disposed in intimate contact with the die surface. After an appropriate dwell period during which the insulating layer has become sufficiently rigidified as a result of the cooling thereof, the vacuum is released and the diaphragm again assumes the position as shown in solid lines in FIG. 6. The resiliency of the fibrous network of the fibrous pad 90 and the fact that use of the thermosetting binder has occasioned a substantially complete cure of the fibrous portion of the pad in the preliminarily molded position causes the fibrous pad, upon release of pressure from the diaphragm, to reassume substantially its original position prior to the vacuum molding step. The use of the vacuum die arrangement of FIG. 6 generally reduces the cost and investment in tooling in comparison to use of a press arrangement employing two mold halves as previously described in connection with FIGS. 1 and 5.

It will be appreciated in accordance with the alternative embodiments as hereinabove described, that the preliminary molding of the fibrous pad can be performed to apply an intermediate contoured and/or embossed configuration thereto, providing for angled and depressed sections so as to obtain desired localized variations in the quantity of liquid plastisol coating on the surface thereof. After subsequent fusion of the plastisol, the final or remolding operation imparts a new finish contour to the pad and further imparts a selected surface texture or finish to the plastisol layer. This embodiment also enables a preliminary molding of different specific panels employing an all-purpose or general mold and a final molding using a specialized mold of the precise configuration. The use of a general purpose mold for the preliminary molding stage substantially reduces the number of molds required to fabricate a variety of finished panels.

the preliminary molding of the semi-cured fibrous blanket in continuous roll form or in precut sections can be conveniently accomplished between heated mold halves, such as heated by hot oil or electric heaters, employing a phenolic type binder at temperatures ranging from about 400° F to about 600° F and, preferably, about 475° F to about 525° F. Hot air molding can also be employed utilizing temperatures of the foregoing magnitude to effect a substantially complete curing of the thermosetting binder and a retention of the preliminary embossed and contoured configuration.

While it will be apparent that the invention as herein described is well calculated to achieve the benefits and advantages hereinabove set forth, it will be appreciated that the invention is susceptible to modification, variation and change without departing from the spirit thereof.

What is claimed is:

1. A process for making a composite contoured and embossed sound insulating panel which comprises the steps of forming a fibrous pad of substantially uniform density and thickness and impregnated with a controlled amount of a heat curable thermosetting binder and a heat softenable thermoplastic binder distributed therethrough, heating the impregnated said pad to an elevated temperature for a period of time sufficient to effect at least a partial curing of said thermosetting binder and a heat softening of said thermoplastic binder to bond the fibers of said pad together into an integral mass, applying a dense liquid vinyl plastisol coating to at least one face surface of said pad, heating the coated said pad to an elevated temperature for a period of time sufficient to effect a fusion of said coating into an integral heat softened layer and a further curing of said thermosetting binder and a heat softening of said thermoplastic binder, positioning the heated said pad with said layer and said thermoplastic binder in a heat softened condition between contoured mold surfaces, cooling said contoured mold surfaces to a temperature below that at which a rigidification of said layer and said thermoplastic binder occurs, partially compressing said pad between said mold surfaces and applying fluid pressure against the inner surface of said layer of a magnitude greater than the fluid pressure at the mold surface against which the outer surface of said layer is disposed to obtain intimate contact therebetween and to impart a preselected contour to said pad and localized embossments therein and to apply a desired surface finish to said layer and simultaneously cooling said pad to effect a rigidification of said thermoplastic binder and said layer to retain the composite pad in said preselected contour incorporating said localized embossments therein, and thereafter discontinuing the application of the fluid pressure and extracting the cooled rigidified shape-retaining said composite pad.

2. The process as defined in claim 1, in which the step of forming said pad is performed such that the controlled amount of thermosetting and thermoplastic binder ranges from about 10% to about 45% by weight.

3. The process as defined in claim 1, in which the step of forming said pad is performed so that the controlled amount of thermosetting and thermoplastic binder ranges from about 25% to about 35% by weight.

4. The process as defined in claim 1, in which said thermoplastic binder is controlled within a range of about 15% to about 95% of the total amount of said binder.

5. The process as defined in claim 1, in which said thermoplastic binder is characterized as having a heat softening temperature of about 220° F to about 400° F.

6. The process as defined in claim 1, in which said thermoplastic binder is characterized as having a heat softening temperature ranging from about 250° F to about 300° F.

7. The process as defined in claim 1, in which said thermoplastic binder comprises a copolymer of vinyl acetate and vinyl chloride and said thermosetting binder comprises a phenolic resin, said thermoplastic binder being present in an amount of about 50% to about 75% of the total binder present.

8. The process as defined in claim 1, in which the step of heating the coated said pad to effect a fusion of said coating is performed at an elevated temperature of about 350° F to about 450° F.

9. The process as defined in claim 1, in which the step of applying a dense liquid vinyl plastisol coating to at least one face surface of said pad is performed in a manner to deposit from about 5 to about 30 ounces per square foot.

10. The process as defined in claim 1, in which the step of simultaneously cooling said pad to effect a rigidification thereof is performed with said mold surfaces at a temperature of less than about 40° F for a period of time of about 10 seconds to about 60 seconds.

11. The process as defined in claim 1, in which the mold surface against which the outer surface of said layer is disposed is foraminous and including the further step of permitting air to be extracted from the region between the outer surface of said layer and the foraminous mold surface.

12. The process as defined in claim 1, in which the mold surface against which the said outer surface of said layer is disposed is of a foraminous construction and including the further step of applying a subatmospheric pressure from said foraminous mold surface.

13. The process as defined in claim 1, in which the mold surface against which said outer surface of said layer is disposed is of a foraminous construction and including the further step of applying a superatmospheric fluid pressure against said inner surface of said layer.

14. The process as defined in claim 1, in which the magnitude of the fluid pressure applied to said inner surface of said layer is greater than the fluid pressure at the mold surface against which said outer surface of said layer is disposed ranges from about 20 in. Hg up to about 28 in. Hg.

15. A process for making a composite contoured and embossed sound insulating panel which comprises the steps of forming a fibrous pad of substantially uniform density and thickness and impregnated with a controlled amount of a heat curable thermosetting binder and a heat softenable thermoplastic binder distributed therethrough, heating the impregnated said pad to an elevated temperature for a period of time sufficient to effect a partial curing of said thermosetting binder and a heat softening of said thermoplastic binder to bond the fibers of said pad into an integral mass, positioning and compressing said pad between contoured mold surfaces to impart a preselected preliminary contour thereto and localized embossments therein and simultaneously heating said pad to effect a substantially complete curing of said thermosetting binder to retain said pad in the preliminarily contoured and embossed configuration, extracting said pad and applying a dense liquid vinyl plastisol coating to at least one face surface of the preliminarily contoured said pad, heating the coated said pad to an elevated temperature for a period of time sufficient to effect a fusion of said coating into an integral heat softened layer and a heat softening of said thermoplastic binder, positioning the heated said pad with said layer and said thermoplastic binder in a heat softened condition between second contoured mold surfaces, compressing said pad between said second mold surfaces and applying fluid pressure against the inner surface of said layer of a magnitude greater then the fluid pressure at the mold surface against which the outer surface of said layer is disposed to obtain intimate contact therebetween and to impart a preselected final contoured and embossed shape to said pad and to apply a desired surface finish to said layer and simultaneously cooling said pad to effect a rigidification of said thermoplastic binder and said layer to retain the composite pad in said preselected final shape, and thereafter discontinuing the application of the fluid pressure and extracting the cooled rigidified shape-retaining said composite pad.

16. The process as defined in claim 15, in which the step of forming said pad is performed to provide a controlled amount of said thermosetting binder and said thermoplastic binder ranging from about 10% to about 45% by weight.

17. The process as defined in claim 15, in which said thermosetting binder comprises from about 50% to about 75% by weight of the total binder present.

18. The process as defined in claim 15, in which the step of heating the coated said pad to effect a fusion of said coating is performed at an elevated temperature ranging from about 350° F to about 450° F.

19. The process as defined in claim 15, in which the mold surface against which the outer surface of said layer is disposed is foraminous and including the further step of permitting air to be extracted from the region between the outer surface of said layer and the foraminous mold surface.

20. The process as defined in claim 15, in which the mold surface against which the said outer surface of said layer is disposed is of a foraminous construction and including the further step of applying a subatmospheric pressure from said foraminous mold surface.

21. The process as defined in claim 15, in which the mold surface against which said outer surface of said layer is disposed is of a foraminous construction and including the further step of applying a superatmospheric fluid pressure against said inner surface of said layer.

22. The process as defined in claim 15, in which the magnitude of the fluid pressure applied to said inner surface of said layer is greater than the fluid pressure at the mold surface against which said outer surface of said layer is disposed ranges from about 20 in. Hg up to about 28 in. Hg.

23. A process for making a composite contoured and embossed sound insulating panel which comprises the steps of forming a fibrous pad of substantially uniform density and thickness and impregnated with a controlled amount of a heat curable thermosetting binder distributed therethrough, heating said pad to an elevated temperature for a period of time sufficient to effect only a partial curing of said binder to partially bond the fibers of said pad into an integral mass, positioning and compressing said pad between contoured mold surfaces to impart a preselected preliminary contour thereto and localized embossments therein and simultaneously heating said pad to an elevated temperature to effect a substantially complete curing of said binder to retain said pad in the preliminary contoured and embossed said configuration, extracting said pad and applying a dense liquid vinyl plastisol coating to at least one face surface of the preliminary contoured said pad, heating the coated said pad to an elevated temperature to effect a fusion of said coating into an integral heat softened layer, positioning the heated said pad with said layer in a heat softened condition with the outer surface of said layer disposed against a second contoured mold surface, compressing said pad against said second mold surface and applying fluid pressure against the inner surface of said layer of a magnitude greater than the fluid pressure at said second mold surface against which the outer surface of said layer is disposed to obtain intimate contact therebetween and to impart a preselected final contoured and embossed shape and to apply a desired surface finish to said layer and simultaneously cooling said pad to effect a rigidification of said layer to retain the composite pad in said shape, and thereafter discontinuing the application of the fluid pressure and extracting the cooled, rigidified shape-retaining said pad.

24. The process as defined in claim 23, in which the step of positioning and compressing said pad between contoured mold surfaces to impart a preselected preliminary contour thereto is performed at an elevated temperature ranging from about 400° F to about 600° F.

25. The process as defined in claim 23, in which the step of forming said fibrous pad is performed such that the controlled amount of thermosetting binder ranges from about 10% to about 45% by weight of said pad.

26. The process as defined in claim 23, in which the step of heating the coated said pad to an elevated said temperature to effect a fusion of said coating is performed at a temperature ranging from about 350° F to about 450° F.

27. The process as defined in claim 23, in which said second mold surface is of a foraminous construction and including the further step of permitting fluid to escape through the foraminous said second mold surface in response to the pressure applied to the inner surface of said layer.

28. The process as defined in claim 23, in which said second mold surface is of a foraminous construction and including the further step of applying a subatmospheric pressure to said second mold surface.

29. The process as defined in claim 23, in which said second mold surface is of a foraminous construction and including the further step of applying a superatmospheric fluid pressure against said inner surface of said layer and enabling escape of fluid between the outer surface of said layer and said foraminous second mold surface to assure intimate contact therebetween.

30. The process as defined in claim 23, in which the magnitude of pressure against the inner surface of said layer and said second mold surface ranges from about 20 in. Hg to about 28 in. Hg.

31. The process as defined in claim 23, in which the step of compressing said pad against said second mold surface is performed by a substantially rigid and contoured third mold surface positioned against the opposite surface of the preliminarily contoured said pad.

32. The process as defined in claim 23, in which the step of compressing said pad against said second mold surface is achieved by a flexible diaphragm disposed in overlying relationship against the opposite surface of the preliminarily contoured said pad and in pressing relationship thereagainst.

* * * * *

UNITED STATES PATENT AND TRADEMARK OFFICE
CERTIFICATE OF CORRECTION

PATENT NO. : 4,098,639
DATED : July 4, 1978
INVENTOR(S) : Sture Erik Olof Noreus et al It is certified that error appears in the above-identified patent and that said Letters Patent are hereby corrected as shown below:

[56] line 3 : "2,759,783" should be --3,759,783--

Column 4, Table I, last column, line 5 : "lost", first occurrence, should be --As gases--

Column 4, line 62 : "cullulose" should be --cellulose--

Column 5, line 21 : After "with" please delete "a"

Column 9, lines 52-53 : "$NaClO_3 + NaCl + H_2SO_4 \rightarrow ClO_2 + 0.5Cl_2 + Na_2SO_4 + H_2O$" should be --$NaClO_3 + NaCl + H_2SO_4 \rightarrow ClO_2 + 0.5Cl_2 + Na_2SO_4 + H_2O$-- line 57 : "$2NaClO_3 + CH_3OH + H_2SO_4 \rightarrow 2ClO_2 + HCHO + \lambda Na_2SO_4 + 2H_2O$" should be --$2NaClO_3 + CH_3OH + H_2SO_4 \rightarrow 2ClO_2 + HCHO + Na_2SO_4 + 2H_2O$--

Column 10, line 1 : "$NaClO_3 + 5NaCl + 3H_2SO_4 \rightarrow 3Cl_2 + 3Na_2SO_4 + 3-H_2O$" should be --$NaClO_3 + 5NaCl + 3H_2SO_4 \rightarrow 3Cl_2 + 3Na_2SO_4 + 3H_2O$-- line 67 : "30" should be -- + --

Column 13, line 11 : "sytem" should be --system--

Signed and Sealed this

Thirtieth Day of October 1979

[SEAL]

Attest:

RUTH C. MASON
Attesting Officer

LUTRELLE F. PARKER
Acting Commissioner of Patents and Trademarks